United States Patent [19]

Strasser et al.

[11] Patent Number: 5,114,131
[45] Date of Patent: May 19, 1992

[54] CIRCULATION-TYPE GRINDING SYSTEM FOR GRINDING BRITTLE MATERIAL

[75] Inventors: Siegfried Strasser, Much; Franz Goeddecke, Leverkusen; Albrecht Wolter, Cologne, all of Fed. Rep. of Germany

[73] Assignee: Kloeckner-Humboldt-Deutz Aktiengesellschaft, Cologne, Fed. Rep. of Germany

[21] Appl. No.: 561,733

[22] Filed: Aug. 1, 1990

[30] Foreign Application Priority Data

Aug. 16, 1989 [DE] Fed. Rep. of Germany ....... 3926882

[51] Int. Cl.$^5$ .............................................. B02C 1/00
[52] U.S. Cl. ........................................ 241/19; 241/29; 241/80; 241/97; 209/139.2
[58] Field of Search ................. 241/19, 24, 29, 78, 241/79.1, 80, 81, 97, 152 A, 224; 209/139.2, 134, 148

[56] References Cited

U.S. PATENT DOCUMENTS

| | | | |
|---|---|---|---|
| 2,795,329 | 6/1957 | Schaub | 209/139.2 |
| 4,357,287 | 11/1982 | Schönert | 241/24 X |
| 4,526,678 | 7/1985 | Myhren et al. | 209/139.2 X |
| 4,703,897 | 11/1987 | Beisner et al. | 241/152 A X |
| 4,728,044 | 3/1988 | Duill et al. | 241/29 X |
| 4,889,289 | 12/1989 | Lohnherr et al. | 241/152 A X |

*Primary Examiner*—Mark Rosenbaum
*Assistant Examiner*—Frances Chin
*Attorney, Agent, or Firm*—Hill, Van Santen, Steadman & Simpson

[57] ABSTRACT

A grinding system for grinding brittle material such as used in the manufacture of cement including a high pressure roller press operated with high pressing forces to form interparticle crushing with incipient cracks in the interior of the particles including recirculating a portion of the material delivered from the press to a sifter locating the sifter directly above the nip and delivering the sifted material downwardly into the nip retaining the structural height of the system low and delivering fresh stock laterally directly into the nip of the roller press to merge with the sifted material entering directly into the nip of the roller press.

8 Claims, 1 Drawing Sheet

CIRCULATION-TYPE GRINDING SYSTEM FOR GRINDING BRITTLE MATERIAL

BACKGROUND OF THE INVENTION

The present invention relates to improvements in roller presses, and more particularly to a roller press capable of interparticle crushing of granular material.

The invention of pressure comminution by interparticle crushing has been disclosed and claimed in patents such as European Patent 0 084 383 and U.S. Pat. No. 4,357,287, Schoenert. Improvements and utilization of the interparticle crushing concept have been disclosed in various patents, such as Beisner et al 4,703,897, which corresponds to European 0 084 383. In this method of comminution or grinding of brittle grinding stock such as is used on non-precomminuted cement clinker, the material is pressed under high pressure in the nip of a high pressure roller press. This causes a destruction of the particles and the production of incipient cracks in the interior of the particles. This is expressed visibly in the formation of agglomerates, commonly called scabs, that can be deagglomerated or disintegrated with comparatively little energy outlay. This process which can generally be termed pressing with the resultant interparticle crushing is accomplished with uniquely high pressing force in the nip between rollers and results in the destruction of grain structure so that a finished fine material is achieved which is distinguished by an overall low specific energy requirement.

In the operation of high pressure roller press pressing or the interparticle crushing procedure, the charging stock is supplied to the nip between oppositely driven rollers and must be drawn into the nip by friction. The individual particles in the nip are drawn into the region of the narrowest nip by friction and are mutually crushed in a product bed so that the term product bed crushing is also applied to describe the interparticle crushing procedure. The particles are mutually crushed between the material by the application of extremely high pressure, resulting in the interparticle crushing.

In apparatus which has been employed for interparticle crushing using a high pressure press, a portion of the coarse material discharged from the roller press has been recirculated. Advantageously, this material is first sifted to eliminate the already fine ground material and to discharge the coarse particles back to the roller press to again be processed.

In practice utilizing this recirculation type of grinding system, the agglomerates which are taken from the roller press are delivered back to the press by the use of a steep conveyor such as a bucket elevator which conveys the particles to a sifter arranged far above the roller press. The grits or coarse particles discharged from the sifter are then conveyed to the material delivery shaft of the roller press. In this type of arrangement, a substantial structural height is required for the equipment and such height is not always available particularly in circumstances where mills are remodeled or modernized and existing systems are rebuilt.

It is an object of the present invention to provide a recirculation type grinding system wherein the equipment requires a comparatively low structural height and involves the use of less mechanical equipment than arrangements heretofore available.

A further object of the invention is to provide an improved recirculation type of interparticle crushing roller press wherein portions are recirculated after being passed through a sifter and an improved stock feed is attained with the sifted coarse material intermixing and blending with the fresh stock in a manner to improve the grinding process.

Another object of the invention is to provide an improved structural arrangement for recirculating grinding stock in an interparticle crushing high pressure roller press wherein the equipment requires substantially less head room and wherein the construction provides for improved feeding and mixing of the recirculated stock with the fresh stock.

FEATURES OF THE INVENTION

In accordance with the principles of the invention, recirculation of a portion of material from the high pressure roller press is obtained wherein the sifter differs from what has been standard heretofore and the sifter is positioned immediately above the nip of the roller press. The lower part of the sifter is itself fashioned as a material delivery shaft for the roller press and is constructed so that it is capable of receiving fresh grinding stock delivered directly to the nip of the roller press.

The arrangement provides for the discharge of the sifter to pass directly downwardly into the nip of the roller press and fresh grinding stock is introduced laterally also discharging directly into the nip of the press and mixing and merging with the coarse grits discharge of the sifter. The fresh stock delivery is arranged to be laterally of the discharge of the sifter such that it does not distort or interfere with the sifter discharge but the two supplies of fresh stock and grits from the sifter are arranged to meld and merge uniformly to feed the material directly to the upwardly facing nip of the roller press. The result is that a structural height of the overall system is comparatively low which effects economies in building space requirements and in mechanical equipment requirements.

An improved more uniform grinding arrangement occurs with the uniform mixing and feed of the fresh stock and the recirculated sifted stock.

Other objects, advantages and features will become more apparent with the teaching of the principles of the invention in connection with the disclosure of the preferred embodiments thereof in the specification, claims and drawings, in which:

DESCRIPTION OF THE PREFERRED EMBODIMENTS

Figure 1:
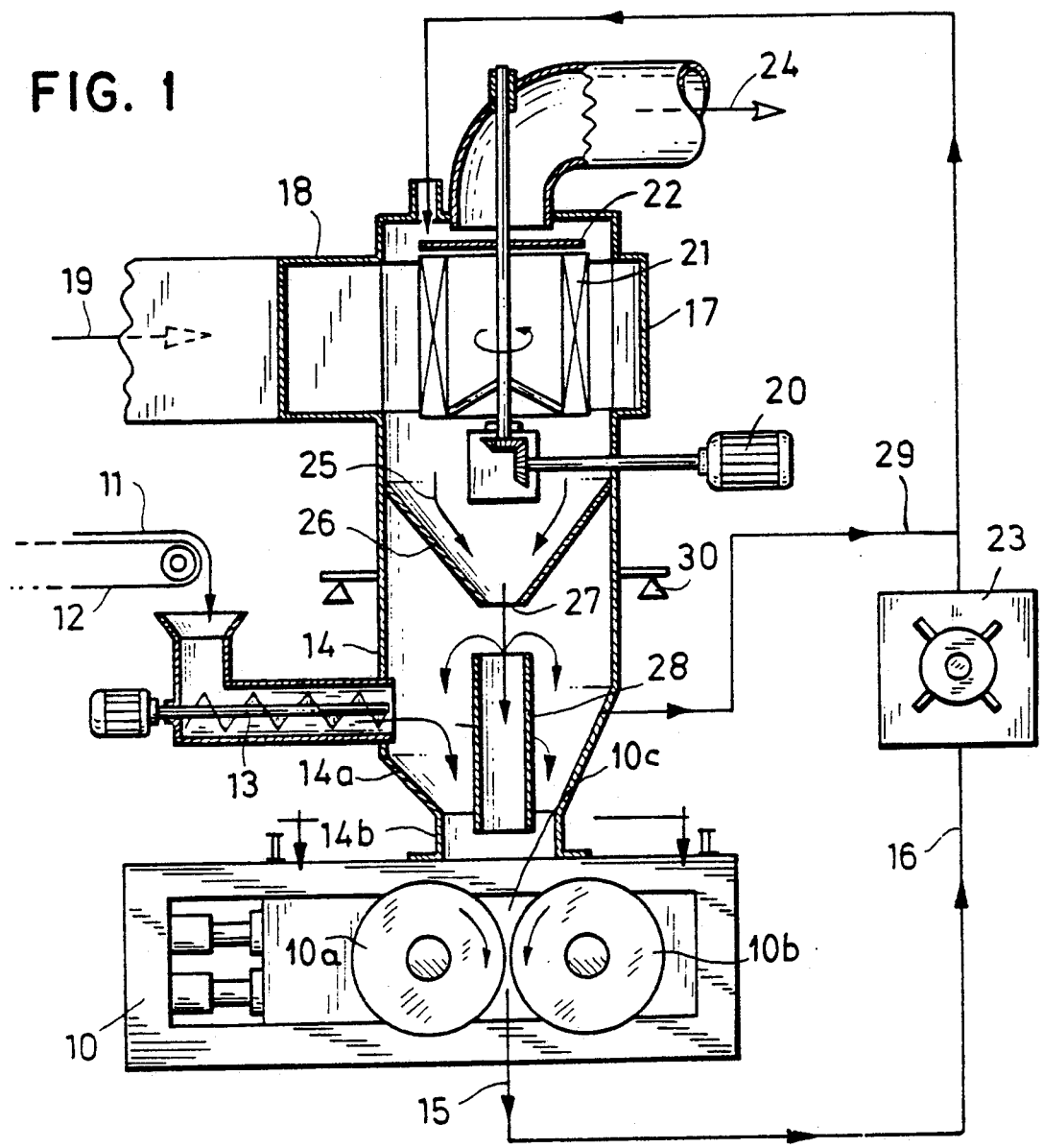
FIG. 1 of the drawing is a vertical sectional view shown in somewhat schematic form of a roller press and equipment for delivering stock thereto constructed in accordance with the principles of the invention.
Figure 2:
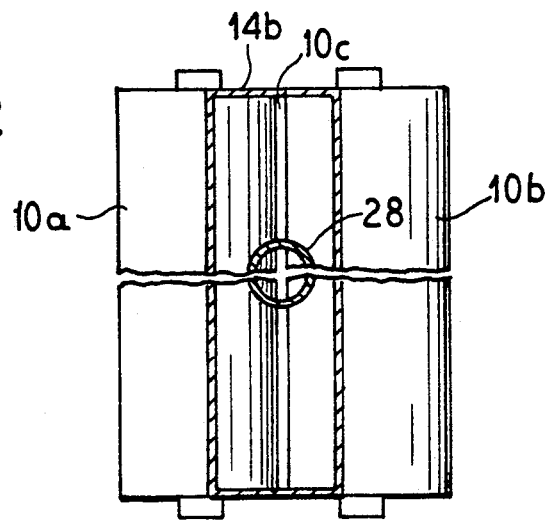
FIG. 2 is a horizontal sectional view taken substantially along line II—II of FIG. 1.

The drawing shows somewhat schematically the flow path of a recirculation type grinding system of the type which is used, for example, in the production of cement.

The initial stage of the circulation grinding includes a high pressure roller press 10 having an upwardly facing nip into which fresh grinding stock 11 is delivered. The nip is formed between two rollers 10a and 10b which form a nip 10c between them. Such grinding stock is carried, such as on a belt conveyor 12, and can be material such as cement clinker, limestone and the like.

The conveyor 12 deposits the material into a pressure screw conveyor 13 which delivers the fresh stock laterally into a vertical material delivery shaft 14.

The grain size of the fresh charging stock can be greater than the width of the narrowest nip.

By way of example, a suitable structural arrangement provides a nip of 20 mm between the two pressing rollers 10a and 10b which have a diameter on the order of 900 mm. The support structure for the rollers is provided such that the forces amount to more than 2 MN/m of roller length, for example, in the range of from 6 through 9 MN/m. The fresh charging stock 11 is comminuted in the nip 10c between the rollers by combined single grain comminution and interparticle crushing.

In the concept of interparticle crushing, the material drawn in between the rollers attempts to force the rollers apart, and the particles of the crushing stock crush one another in the nip in a fill or in a product bed resulting in product bed comminution.

The constituents of cement clinker and limestone emerge from the nip comminuted and partially agglomerated, that is, pressed into scabs 15. A portion of the particles have already been reduced to the desired cement fineness which can be relatively high, for example, 25% smaller than 90 $\mu$m.

The agglomerates or scabs 15 are conveyed via a conveyor 16, such a bucket elevator, to the product admission of a sifter 17. The sifter is an air sifter with sifting air being delivered laterally via a helical housing 18. A rotatable rod basket 21 has turbo elements as well as a rotating distributing plate 22 for the charging stock of the sifter which can be structured so as to function as a deagglomerator for the deagglomeration of the scab fragments as well as impact crushing. The rod basket 21 is driven by a motor 20 which is arranged in the sifter 17.

In one form the sifter 17 may be preceded by an external deagglomeration comminutor 23 which functions to break up the agglomerates prior to the material being delivered to the sifter 17.

The sifting air 24 picks up the finished product which is the material which has been ground to the finished fineness needed for cement and that material is withdrawn from the sifter and is conveyed to a separator (not shown) in which the finished product is separated from the sifting air. A substream of the sifting airstream 24 that leaves the sifter 17 can be recirculated to the inflowing sifting air 19.

The coarse grain fractions or grits 25, which are separated by the sifter 17, are discharged downwardly to a discharge opening 27 via a cone shaped container or guide that gathers the material or conveys it to a center stream. This cone part 26 is situated within the grits discharge container 14 which supports the sifter immediately above the nip of the roller press 10. Below the conical portion 26 and the discharge opening 27, is an adaptor guide 4a which has a tapering cross-section to guide the material downwardly directly into the center of the nip between the rollers. The downward tapered portion 14a leads to a shaft section 14b which has a rectangular cross-section for further containing the material and delivering it to the center of the nip.

Centered within the shaft 14 is a vertical tube or distributor member 28 that distributes the grits from the sifter. The distributor element 28 functions to distribute the sifter grits and a melding or merging of the grits with the fresh stock occurs distributing the grits relatively uniformly through the fresh grinding stock 11 to enter the nip in a uniform distribution.

It is contemplated that the level of the material fill in the grits discharge container 14 would be measured. This container simultaneously forms the material delivery shaft for the roller presses combined with the parts 14a and 14b. In some instances, it is desirable to control the level and maintain it at a constant height or maintain it within allowable limits so that a controlled operation can take place dependent on the level of material fill. It would also be required to control the quantity of fresh grinding stock 11 or maintain a relationship between the fresh grinding stock and the amount of grits. For this purpose, a grits overflow conduit 29 is provided which overflow is in communication with the scabs recirculation lines 15 and 16. To control the level of fill in the container 14 and also to control the proportioning of amount of grits fed to the nip relative to the fresh stock, a mechanism can be provided for such measurement of material by a weighing arrangement, and pressure pickups 30 may be provided which function to reflect the amount of sifter material being delivered.

The cross-section of the grits discharge container 14 can be round or rectangular or square. The pressure worm 13 for the delivery of fresh grinding stock enters the material delivery shaft of the roller press laterally transversely relative to the nip of the roller press 10.

It will be observed that the requirements for mechanical apparatus are relatively small, yet allowing for the construction of a compact circulating type grinding system utilizing the energy saving interparticle crushing roller press. The arrangement also permits the simple modernization of existing old systems with minimum remodeling of existing sifter equipment for the purposes of integrating the energy saving high pressure press technique.

Thus, it will be seen there has been provided a mechanism and method which accomplishes the objectives above set forth and permits a direct delivery and mixing of recirculated grits with the discharge being positioned directly above the nip of the high pressure roller press with a thorough intermixing with fresh stock.

We claim as our invention:

1. A grinding system for grinding brittle material such as used in the preparation of cement comprising in combination:

a pair of rollers having an upwardly facing high pressure grinding nip therebetween forming a particle bed comminution press delivering agglomerates with incipient cracks in the interior of the particles;

a sifter positioned directly and immediately above the nip directly delivering sifter material grits to the press nip;

means delivering a portion of the ground stock emitted from the press to the sifter for recirculation;

a material delivery shaft rectangular in cross-section positioned immediately above the nip, said shaft forming a unitary delivery shaft for grits and for fresh grinding stock;

a distributor member extending down from the sifter carrying grits and extending down into said rectangular shaft;

a lateral stock delivery connected to deliver fresh grinding stock directly above the nip into said delivery shaft filling the shaft to maintain a supply above the roller to be drawn into the nip joining the stream of grits from the sifter so that fresh stock and sifter stock merge together in said rectangular shaft so that a mixture of grits and fresh stock are drawn together into the nip;

and means for accumulating a predetermined amount of stock and grits from the sifter and fresh stock above the roller nip.

2. A grinding system for grinding brittle material such as used in the preparation of cement constructed in accordance with claim 1:

wherein the sifter is a dynamic sifter having a housing with lateral sifting air admission and having a discharge for sifting air and fine product arranged at the upper side and having a grits discharge container arranged at the under side into which fresh stock is delivered.

3. A grinding system for grinding brittle material such as used in the preparation of cement constructed in accordance with claim 1:

wherein the sifter is an air sifter and has a lateral air delivery conduit delivering air to the sifter.

4. A grinding system for grinding brittle material such as used in the preparation of cement constructed in accordance with claim 1:

including a deagglomerator connected to the delivery means for deagglomerating stock recirculated to the sifter.

5. A grinding system for grinding brittle material such as used in the preparation of cement constructed in accordance with claim 1:

wherein the fresh stock delivery means includes a forced screw delivery conduit delivering stock to the nip.

6. A grinding system for grinding brittle material such as used in the preparation of cement constructed in accordance with claim 1:

wherein the sifter delivers downwardly to a conically shaped chamber having a smaller discharge opening positioned directly above the nip;

and said distributor member includes a tube interposed between the nip and the discharge of the conically shaped chamber, and said fresh stock delivery is positioned laterally of the tube with the fresh stock and sifted stock merging and flowing into the nip.

7. A grinding system for grinding brittle material such as used in the preparation of cement constructed in accordance with claim 1:

including means for measuring and controlling the amount of stock delivered from the sifter for maintaining a predetermined proportion of grits from the sifter relative to the amount of fresh grinding stock.

8. A grinding system for grinding brittle material such as used in the preparation of cement constructed in accordance with claim 7:

including means for diverting a portion of material from the sifter before it enters the press nip to maintain a controlled proportion between fresh stock and stock from the sifter.

* * * * *